United States Patent [19]

Auerbach

[11] 3,717,817

[45] Feb. 20, 1973

[54] TUNING OPTIMIZATION CIRCUIT FOR F.M. TUNER INCLUDING MEANS FOR DETECTING MAXIMUM QUIETING

[75] Inventor: Richard Auerbach, Smithtown, N.Y.

[73] Assignee: Harmon-Kardon, Incorporated, Plainview, Long Island, N.Y.

[22] Filed: Sept. 30, 1970

[21] Appl. No.: 76,750

[52] U.S. Cl. ..................325/455, 325/363, 325/477, 324/81, 334/30, 334/31, 334/86

[51] Int. Cl. ..............................................H04b 1/06

[58] Field of Search........325/62, 305, 348, 363, 455, 325/477, 67; 324/81; 179/15 BT; 334/30, 31, 86

[56] References Cited

UNITED STATES PATENTS

| | | | |
|---|---|---|---|
| 3,101,446 | 8/1963 | Glomb et al. | 325/363 |
| 3,104,356 | 9/1963 | Hedger | 325/348 |
| 3,305,781 | 2/1967 | Robinson | 325/305 |

*Primary Examiner*—Albert J. Mayer
*Attorney*—Sandoe, Hopgood and Calimafde

[57] ABSTRACT

A tuned circuit resonant at a frequency outside the audio frequency range is coupled to the output of the front end and i.f. stages of a communication receiver. A detector is coupled to the tuned circuit and an indicator is coupled to the detector. Optimum receiver tuning and antenna orientation is indicated when the indicator reading is at a minimum.

5 Claims, 1 Drawing Figure

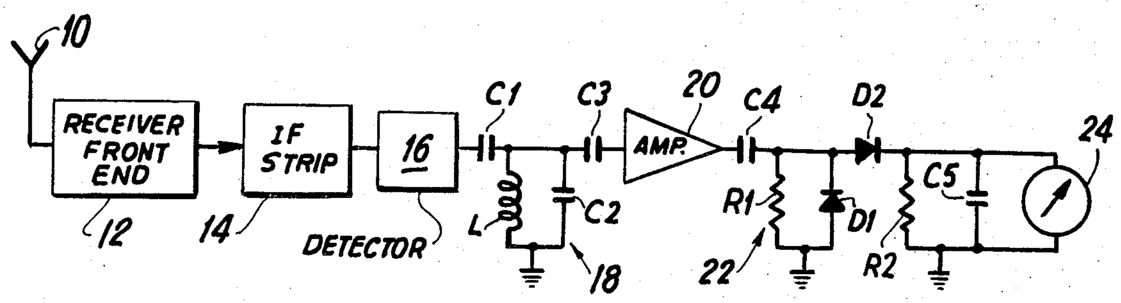
INVENTOR.
RICHARD AUERBACH
BY
Sandoe, Hopgood & Calimafde
ATTORNEYS

TUNING OPTIMIZATION CIRCUIT FOR F.M. TUNER INCLUDING MEANS FOR DETECTING MAXIMUM QUIETING

The present invention relates generally to communication receivers, and more particularly to a tuning indicator for use in an FM, AM or similar receiver.

In the operation of communication receivers it is desirable that means be provided to give the listener a visual indication that the receiver is optimally tuned to the selected station. An indication of this sort is particularly important in FM stereophonic reception in which optimum tuning may be critical to enjoy satisfactory stereophonic reception. In areas remote from the FM broadcasting station, the listener, in addition to operating the tuning, to wit, local oscillator, control to perform station selection, may also adjust the orientation of the receiving antenna to achieve optimum reception. By performing the tuning or station select operation while simultaneously observing the visual tuning indicator and listening to the quality of the received audio signal, the listener attempts to establish optimum tuning and signal reception.

Conventional FM receivers and tuners are commonly provided with tuning indicators such as a tuning meter or a so-called "tuning eye" or indicator tube. In the former, an ammeter or voltmeter is connected in the front end or r.f. stage of the receiver to indicate the amplitude of the envelope of the received r.f. signal, such as by measuring the level of the automatic gain control (agc) voltage. A maximum reading of the meter corresponding to a maximum amplitude of the r.f. signal is interpreted as optimum tuning. In the indicator tube, a narrow beam indicating optimum tuning may be achieved, as is common in indicators of this type, when the agc bias voltage reaches a maximum negative value.

The maximum readings of the conventional tuning indicators, however, often do not correspond to the optimum tuning of the receiver, primarily as a result of misalignment in the receiver i.f. stages and detector stages which follow the r.f. stages in a conventional FM receiver. That is, the maximum reading of the tuning indication merely indicates optimum tuning of the r.f. stages, and does not consider the optimum setting of the succeeding receiver stages. As a result, a listener who is led by an observation of the tuning indicator to believe that tuning of the receiver has been optimized at the selected station, may be actually operating his receiver at less than optimum conditions. Moreover, it is often difficult, particularly for an untrained person, to detect the actual maximum deflection of the conventional tuning indicator dial since a maximum or near maximum dial reading may be obtained over a considerable range of tuning control variation.

It is thus an object of the invention to provide a tuning indicator for a communication receiver which provides an unambiguous indication of optimum tuning of the receiver at the selected station.

It is another object of the invention to provide a tuning indicator for an FM receiver or the like which provides an indication of optimum tuning which takes overall receiver performance into consideration.

It is a further object of the invention to provide a tuning indicator for an FM receiver or the like that ensures optimum tuning control and antenna orientation in a clear and readily comprehended manner.

The tuning indicator of the invention is premised on the theoretical consideration that maximum quieting, that is, the maximum reduction of the level of background noise, is achieved when the receiver is tuned to the best possible point. At maximum quieting, the signal-to-noise ratio at the output of the receiver is at a maximum. Quieting continues to improve as the received signal strength increases up to approximately 2000$\mu$v, after which the improvements in quieting are relatively minor.

In the tuning indicator of the invention, an indicator coupled to the output of the detector stage provides a reading of the noise level at a selected frequency above the audio range. When the receiver is tuned between stations, the noise level is high; as the tuning approaches a station the noise level decreases. When the reading of the indicator, and thus of the noise level, is a minimum, the receiver is tuned for optimum reception.

To the accomplishment of the above and to such further objects as may hereinafter appear, the present invention relates to a optimization circuit for an FM tuner substantially as defined in the appended claims and as described in the following specification taken together with the accompanying single figure which schematically illustrates an embodiment of the tuning indicator of the invention.

In the circuit shown in the drawing, an F.M. receiver includes a receiving antenna 10 coupled to the front end 12 of the receiver which may include, as is conventional, one or more stages or r.f. amplification, a tunable local oscillator and mixer, as well as automatic gain control circuitry. The output of front end 12 is coupled to an i.f. strip 14 which may contain one or more stages of i.f. amplification. I.F. strip 14 is in turn coupled to a detector 16 such as a discriminator, ratio detector, or other method of detection.

In accord with the present invention the output of detector 16 at a point prior to the audio amplifier and deemphasis circuit, and before the multiplexer circuit and/or muting circuit if included in the receiver, is coupled through a capacitor C1 to a tuned circuit generally designated 18 which includes a capacitor C2 and an inductor L connected in parallel to ground. In a preferred embodiment of the invention, tuned circuit 18 is tuned to approximately 100KHz, that is, above the audio frequency range, and above possible Subsidiary Communication Authorization (SCA) stations. Signals at the selected tuning frequency are thus limited to the frequency range containing only background noise signals. However, any frequency may be used if no information occupies the range chosen.

The output of tuned circuit 18 is coupled through a capacitor C3 to an amplifier 20 the output of which is coupled through a capacitor C4 to an AM detector generally designated 22. Detector 22 comprises a resistor R1 connected in parallel to ground with a diode D1 and a diode D2. The output of diode D2 is coupled to a smoothing circuit comprising a capacitor C5 connected in parallel to ground with a resistor R2. An indicating device here shown in the form of a voltmeter 24 is coupled across the smoothing circuit and provides a reading of the voltage developed thereacross in response to the detected 100KHz noise signal.

In operation, the receiver tuning (local oscillator) control is performed and, if desired, receiving antenna 10 is adjusted to bring about a null or minimum reading of meter 24 at the selected channel. That null, which in contrast to a maximum deflection of the meter dial in the conventional tuning indicator, can be readily and precisely located to indicate a minimum level of background noise. A minimum reading of meter 24 thus indicates that the receiver has been optimally tuned.

The tuning indicator of the invention provides a highly accurate and unambiguous indication of when the receiver is set to its best point to achieve maximum quieting and optimum reception. It achieves this by the use of a relatively few additional, low-cost components and can thus be readily incorporated into standard FM receivers at little additional cost. While the indicator has been herein shown in the form of a meter, other indicating devices such as indicating tubes may be employed in the indicator circuit of the invention to equal advantage.

Thus while only a single embodiment of the present invention has been herein specifically described it will be apparent that modifications may be made therein without departing from the spirit and the scope of the invention.

I claim:

1. In a communications receiver such as an FM tuner or the like having an antenna, an input stage coupled to the antenna, a tuned circuit having a variable resonant frequency coupled to the input stage, and means for varying the resonant frequency of said tuned circuit for selecting a received signal at a given r.f. frequency, an i.f. stage coupled to the tuned circuit, and a detector coupled to the i.f. stage, the improvement which comprises: a tuning indicator comprising frequency selecting means coupled to the output of said detector for passing signals at a frequency in the noise range, above the audio frequency range, and below the r.f. range, and optimum tuning indicating means coupled to the output of said frequency selecting means for providing a continuously varying indication of the amplitude of the output of said frequency selecting means in response to the variation of the resonant frequency of the tuned circuit or the orientation of the antenna, and for providing a visual indication of the minimum amplitude of the output signal of said frequency selecting means which occurs when the tuned circuit is tuned for optimum reception of the received signal, and/or when the antenna is optimally oriented, thereby to indicate maximum quieting and optimum tuning of the receiver for said given frequency.

2. The indicator of claim 1, further comprising detector means interposed between said second tuned circuit and said indicating means.

3. The indicator of claim 2, in which said second tuned circuit is tuned to a frequency of approximately 100KHz.

4. The indicator of claim 3, further comprising an amplifier interposed between said second tuned circuit and said detector means.

5. The indicator of claim 1, in which said frequency selecting means comprises a second tuned circuit having a fixed resonant frequency at said noise frequency.

* * * * *